(12) United States Patent
Roske et al.

(10) Patent No.: US 7,644,790 B2
(45) Date of Patent: Jan. 12, 2010

(54) HYBRID DRIVE MECHANISM AND METHOD FOR OPERATION THEREOF

(75) Inventors: Michael Roske, Friedrichshafen (DE); Christian Mittelberger, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 466 days.

(21) Appl. No.: 11/583,543

(22) Filed: Oct. 19, 2006

(65) Prior Publication Data

US 2007/0095584 A1 May 3, 2007

(30) Foreign Application Priority Data

Oct. 27, 2005 (DE) .................. 10 2005 051 382

(51) Int. Cl.
*B60W 20/00* (2006.01)

(52) U.S. Cl. .................................. 180/65.22

(58) Field of Classification Search ............. 180/65.22, 180/65.245, 65.28, 65.285
See application file for complete search history.

(56) References Cited

U.S. PATENT DOCUMENTS

| | | | | |
|---|---|---|---|---|
| 5,842,534 | A * | 12/1998 | Frank ....................... | 180/65.25 |
| 6,116,363 | A * | 9/2000 | Frank ....................... | 180/65.25 |
| 6,176,807 | B1 | 1/2001 | Oba et al. | |
| 6,227,997 | B1 | 5/2001 | Fujisawa et al. | |
| 6,447,417 | B2 * | 9/2002 | Kanehisa ....................... | 475/5 |
| 6,581,705 | B2 | 6/2003 | Phillips et al. | |
| 6,629,027 | B2 * | 9/2003 | Yamaguchi et al. ........... | 701/22 |
| 6,805,648 | B1 | 10/2004 | Ehrlinger | |
| 6,809,429 | B1 * | 10/2004 | Frank ....................... | 290/40 C |
| 6,817,327 | B2 | 11/2004 | Ehrlinger et al. | |
| 7,021,409 | B2 | 4/2006 | Tamor | |
| 2004/0112652 | A1 * | 6/2004 | Esposito Corcione et al. .... | 180/65.2 |

FOREIGN PATENT DOCUMENTS

| | | |
|---|---|---|
| DE | 295 02 906.4 | 8/1995 |
| DE | 195 03 500 A1 | 8/1996 |
| DE | 199 01 470 A1 | 7/1999 |
| DE | 199 26 510 A1 | 12/1999 |
| DE | 199 31 770 A1 | 1/2001 |
| DE | 199 34 696 A1 | 5/2001 |
| DE | 101 49 905 A1 | 8/2002 |
| DE | 102 29 535 A1 | 1/2003 |
| DE | 101 52 471 A1 | 5/2003 |
| WO | WO-01/56678 A1 | 8/2001 |

* cited by examiner

*Primary Examiner*—Frank B Vanaman
(74) *Attorney, Agent, or Firm*—Davis & Bujold, P.L.L.C.

(57) ABSTRACT

A device and method for implementing a hybrid drive mechanism, which stands out by a very low construction expenditure, a small need of installation space, low cost of parts and a simple and effective maneuverability. Particularly, the start and stop of the internal combustion engine should stand out by simplicity and reliability. By a development of a one clutch, hybrid drive mechanism or without an additional second clutch, the needed installation space and costs can be minimized and by control, the expenditure for and the complexity of the control or regulation of a hybrid drive mechanism are considerably reduced. An electric machine (4) is disposed between a single clutch (2) situated between the internal combustion engine and a mechanical transmission (5) so that the electric machine can transmit a positive or negative torque directly to a transmission input shaft of the mechanical transmission.

2 Claims, 3 Drawing Sheets

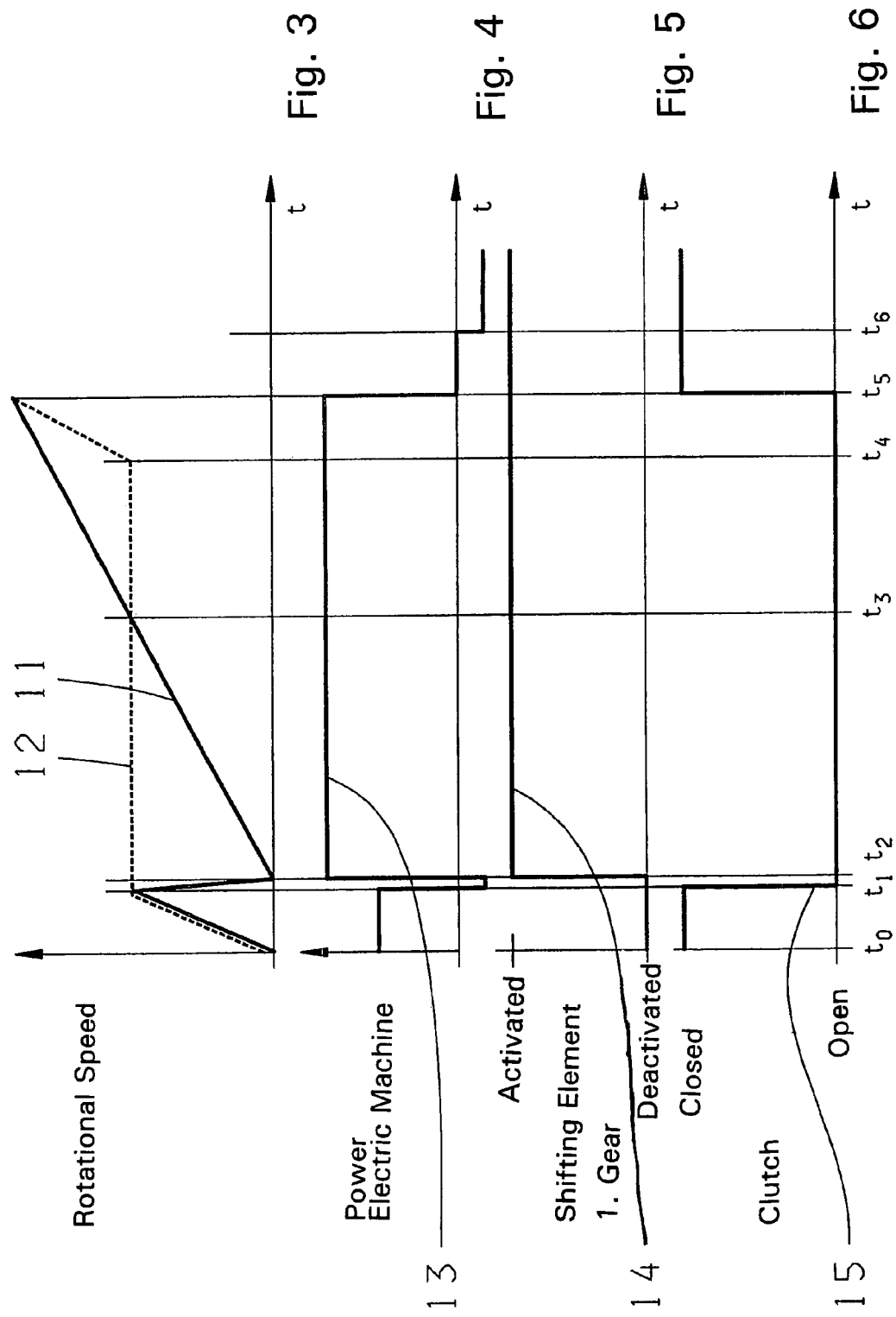

HYBRID DRIVE MECHANISM AND METHOD FOR OPERATION THEREOF

This application claims priority from German Application Serial No. 10 2005 051 382.4 filed Oct. 27, 2005.

FIELD OF THE INVENTION

The invention relates to a hybrid drive mechanism and to a method for operation thereof.

BACKGROUND OF THE INVENTION

Because of the low particulate emissions on the vehicle side and of the low need of fuels, so-called hybrid drive mechanisms have become increasingly important in automobile construction. They contain, at least one additional electric machine as an added drive mechanism, together with a conventional internal combustion engine which is based on a piston motor with internal combustion.

It is optionally customary to operate both drive mechanisms separately and, in the case of low speeds when traveling at constant speed or at low acceleration, to exclusively use the electric machine as a drive mechanism while the internal combustion engine either runs along in idle drive or load free or is separated from the drive train and disengaged. Conversely, the internal combustion engine serves as a prime mover when driving with great need of power while the electric machine is uncoupled, runs along free of load or works as a generator.

It is further known that by simultaneous operation of both motors in the so-called boost operation, to achieve a specially high momentary driving power, the same as to use the electric machine in delay operations of the vehicle for so-called recuperation and thus recover motion energy of the vehicle in the form of electric energy.

Against these advantages of the hybrid drive mechanisms, however, stand a considerable constructional expense and often a considerable expenditure in regulation technology.

Very attractive solutions of the linkage of an internal combustion engine and an electric machine in a drive train of a vehicle result from the laid-open publications DE 199 34 696 A1 and DE 101 52 471 A1. In both cases, a planetary transmission is used as a summarizing transmission in order to couple an internal combustion engine and an electric machine, on one hand, and an input shaft of a mechanical transmission with another on the other. Planetary transmissions stand out by small construction volume and weight in relation to the transmissible outputs. By relatively simple modifications, it is optionally possible to decelerate the sun gear, the planetary gears or the ring gear and multiple possibilities of torque conversion and torque control are implemented. Such a solution, of course, associated with considerable added costs for the planetary transmission and other additional elements as clutches and brakes. Lastly, a planetary transmission requires additional installation space which considerably complicates the transmission on already existing drafts of drive mechanisms.

A simpler known version of a hybrid drive mechanism is more strongly supported on a conventional layout of a drive train and, therefore, aids better assembly and conversion of existing drive drafts. For this, a conventional drive train—consisting of an internal combustion engine, a mechanical transmission and therebetween a first clutch—is only separated in the area between the internal combustion engine and the first clutch and one electric machine is inserted, the same as a second clutch between the electric machine and the mechanical transmission.

Such a construction makes a purely electromotive start possible when the second clutch is closed and the first clutch open. The internal combustion engine can then be started while the first clutch, between an electric machine and internal combustion engine is closed. The second clutch between electric machine and transmission can be at least partly open to reduce reactions on the moving behavior of the vehicle, due to rotation uniformities, during start of the internal combustion engine.

This known solution, however, stands out by a relatively expensive regulation technology for control of both clutches according to a multiplicity of factors to be taken into account and, lastly by the need of providing a second clutch between the internal combustion engine and the transmission. This, together with the expenses associated therewith, also relative to the existing installation space, is critical in particular, since the added clutch must be capable of transmitting at least the whole power of the internal combustion engine and, due to the insertion of the second clutch, there necessarily results one other shaft to be independently supported in the area of the electric machine.

With this background, the problem on which the invention is based is to introduce a device for implementing a hybrid drive mechanism which stands out by a very small construction expenditure, a small need of installation space, low cost of parts and a simple and effective maneuverability. The invention is also based on the problem of introducing a method for control or regulation of such a device, especially for the start and stop of the internal combustion engine preferably to be carried out automatically, which stands out by simplicity and reliability.

SUMMARY OF THE INVENTION

The invention is based on the knowledge that by a development with only one clutch or without an additional clutch, the needed installation space and the expenditure are minimized and, at the same time, by the inventive control, the expenditure for control and regulation of the hybrid drive mechanism and the complexity thereof can be considerably reduced.

The point of departure of the invention is a hybrid drive mechanism having an internal combustion engine, which can deliver an input torque to a motor output shaft. One clutch is provided which can transmit a torque between the internal combustion engine and an input shaft of a mechanical transmission. The mechanical transmission has a variable ratio and converts a transmission input torque abutting on the transmission input shaft and an appertaining transmission input rotational speed into a transmission output torque abutting on an output torque of the transmission and an appertaining transmission output rotational speed. It also has a neutral position in which essentially no torque can be transmitted by the input shaft to the output shaft of the transmission. The hybrid drive mechanism also has an electric machine available, which can, likewise, deliver or absorb an input torque in the operation of the transmission generator, which can act upon the input shaft of the transmission. The electric machine is connectable via a power electronic system with an energy accumulator.

Such arrangements are already known from the prior art, but have regularly a number of other elements, especially other transmission-like, planetary transmission connected as summarizing transmissions and/or at least one other clutch. The added elements increase the expenditure and therewith the costs of known hybrid drive mechanisms demand installation space complicating the integration of a hybrid drive mechanism in an existing drive draft.

To solve the stated problem, in relation to the device, it is provided that the electric machine is situated between the single clutch, placed between the internal combustion engine and the mechanical transmission so that the electric machine can directly transmit a positive or negative torque to the transmission input shaft of the mechanical transmission.

Here the expression "directly" is given a special meaning and is defined more accurately below.

By a direct transmission of a positive or negative torque of the electric machine to the transmission input shaft is here and, in what follows, understood as a transmission in which the torque abutting on the shaft of the electric machine and the appertaining rotational speed acts unchangeably, necessarily and with a minimal number of intercalated transmission elements on the transmission input shaft.

A direct transmission exists, for example, when the electric machine is disposed on the transmission input shaft so that the shaft of the electric machine and the transmission input shaft are either identical or in form at least of a hollow shaft and of a shaft non-rotatably connected therewith are coaxially coupled with each other.

A direct transmission, however, exists also when a gearwheel, for example, situated on the shaft of the electric machine, meshes with a gear wheel non-rotatably disposed upon the transmission input shaft. Even though by virtue of different numbers of teeth is possible here to achieve a ratio of rotational speed and torque. This is fixed and neither changeable nor shiftable. Via gear wheels, the coupling is a coupling, via alternative means, as a chain drive obviously synchronized.

On the other hand, not as a direct transmission, all arrangements are considered where shiftable intermediate transmission, shiftable clutches or similar elements are provided which optionally make introducing a torque abutting on the shaft of the electric machine possible or to optionally make possible a converting torque and rotational speed of the shaft of the electric machine to another rotational speed abutting on the transmission input shaft and a torque abutting there.

By a minimum number of intercalated transmission elements are correspondingly to be also understood arrangements, which make the mechanical coupling of a torque of the electric machine possible in different installation positions thereof. If the shaft of the electric machine, for example, due to the existing installation space is to be concentric or at least parallel with the transmission input shaft, universal couplings or one front bevel gear are obviously to be provided.

By virtue of the inventive design of the hybrid drive mechanism, on one hand, it is possible to minimize the construction expenditure for a hybrid drive mechanism and, especially by eliminating other elements requiring control or regulation, the conditions for a specially simple and reliable mechanically sturdy integration of the electric machine in an input drift is made possible. Besides, a changeover of an existing conventional drive draft is, in particular, easily possible regarding the number of elements to be additionally provided and also regarding the needed installation space and the expenditure to be covered in control or regulation technology.

In a preferred embodiment of the invention, the transmission is a power shift automatic transmission. By an automatic transmission is here to be understood a transmission which has a controllable variable ratio, which can be continuously variable or stepped and which, from information issued by an authority other than a human operator with the aid of prepared energy, is capable of a change of the reduction ratio.

By power shift transmission is to be understood that a transmission capable of a change of the reduction ratio without interruption of the traction force necessarily resulting in the process.

Power shift automatic transmissions are of particular advantage in vehicles the operation of which stands out by frequent changes of the transmission ratio. Due to the power shift capacity the driving properties are decisively improved by the acceleration capacity, being increased and an otherwise generating jerk is prevented; a result of the interruption of the tractional force. The equipment of such a vehicle with an automatic transmission has already been shown as result of the above discussed frequent changes of the reduction ratio in order to unburden the driver. For the reasons already described, the power shift automatic transmission is meant especially for the use in omnibuses and delivery vehicles, the same as taxis used in scheduled service.

At the same time, the conversion of the above described inventive input draft is for these vehicles particularly advantageous since, on one hand, in those vehicles with relative expensive and, therefore, also costly transmission, the additional expenditure for implementing a hybrid drive mechanism comparatively carries not much weight and since, precisely in these vehicles, special importance is attached to the sturdiness of the driving system. When used in city traffic, the potential in energy that can be saved by the inventive hybrid drive mechanism is also specially great.

According to an alternative of the method, when the clutch is designed as frictional clutch, this mostly offers the advantage that the already existing clutch can further be used in a change of a conventional vehicle draft to a hybrid drive mechanism. Only for the case that the clutch had formerly been actuated directly by the driver is a corresponding actuator and an adequate sensor system provided.

If the drive train, however, is basically modified or replanned, a form-locking clutch can be provided with special advantage and particularly a specially favorable and sturdy anti-wear, dog clutch instead of a frictional clutch whereby expenses and installation space can again be saved.

Independently of the kind of clutch used, electromechanical or electromagnetic actuators can be used here for actuation of the clutch. These stand out by quick reaction times and a small expenditure for needed lines. In addition, they offer the advantage of being fully capable of functioning directly before and after a cold start. On the other hand, pneumatically or hydraulically actuated clutches need at least a certain time interval of pressure build up in a cold start and, besides imply a higher expenditure in construction volume and cost of the needed fluid lines. But inasmuch as the needed accessory aggregates like pressure accumulators and pumps are anyway present or the sturdiness, and reliability of the system has to satisfy special demands, pneumatic or hydraulic systems offer, in turn, specific advantages.

At the same time, it is of advantage that a control device be provided which directly or via the respective powers can influence both the rotational speed of the internal combustion engine and of the electric machine. This control device is, in addition, adequate and provided for controlling or regulating the clutch and, furthermore, can read-in, at least indirectly, information about the level of the energy accumulator and be able to control the power electronic system so that a desired positive or a negative torque is made available by the electric machine. Such a control device can thus control, regulate or coordinate all relevant elements.

The expression control is understood in this connection as taking influence and does not rule out that, for example, for control of the power and rotational speed of the internal combustion engine, an independent motor control unit be provided which is supplied by the above described control device only with information which ultimately has a corresponding adjustment of power and/or rotational speed as a consequence. It also is evidently possible within the framework of the invention, at least in partial ranges of the control or regulation through the control device, to ask individual elements only as to relevant parameters and thus enter these as command variables which are not changed themselves.

Finally, it hardly needs mention that within the scope of this publication, the expression of the control device is to be understood functionally and, in particular, does not presuppose any independent device located in a separate housing. The individual functions or function blocks can rather be implemented just as well in different other controls which are interconnectable according to data system technology.

In detail herebelow, the inventive method will be explained, which stands out by the fact that based on the above explained devices, it provides that in a desired start of the internal combustion engine the control device ensures that the mechanical transmission is in a neutral position, thereafter controls the clutch so that it is at least partly closed and controls the power electronic system so that the electric machine produces a positive torque of the selected direction of rotation. The direction of rotation of the electric machine evidently is in the practice always oriented so that the internal combustion engine can be started in its provided direction of rotation.

The torque of the electric machine is further transmitted by the clutch to the motor output shaft of the internal combustion engine. Finally, should it be necessary from the point of view of the internal combustion engine, the control device issues a signal, when reaching a suitable rotational speed of the internal combustion engine, which generates the start of the internal combustion engine by introducing the injection of fuel and the ignition thereof.

In the manner described, a start of the internal combustion engine within the hybrid drive mechanism is possible with only one clutch and besides from the point of view of expenditure in control and regulation technology can be formed especially easily and reliably.

In another development of the method, for subsequent drive of the vehicle by way of the electric machine, after start of the internal combustion engine with desired input by the electric machine, the control device provides, first, to completely open the clutch and influence the rotational speed of the electric motor so that almost synchronous rotational speed abuts on the transmission input shaft for the gear to be activated, specifically to the extent that the desired shifting operation of the mechanical transmission can be carried out without problem. In the case of activation of the first gear, this means a deceleration to almost stoppage.

When changing gears to higher driving gears, the synchronous rotational speeds to be adjusted result from the target gear and the momentary driving speed of the vehicle optionally taking into account a rotational speed window. It evidently is also possible here that the rotational speed of the electric motor for reaching the target rotational speed has to be boosted. The control device then activates a desired drive gear of the mechanical transmission and thereafter operates by motor the electric machine by an adequate control of the power electronic system so that there result, or as far as possible result, the desired speed curve of the driven wheels of the vehicle insofar as there do not stand opposed power limits of the electric machine or priorly graded information about the level of the energy accumulator.

In connection, for example, with the operation of a known stop-start system, the control device obviously can also disengage again when it can be seen that the internal combustion engine will not be used in the near future. Because of the open clutch, this has no influence upon the above described electric drive.

It is finally provided in a last development of the inventive method that the control device in the case where is wished a switching on of a torque prepared by the internal combustion engine on the input shaft of the mechanical transmission, the rotational speed of the internal combustion engine rises to the extent of being at least almost synchronous with the rotational speed of the input shaft of the mechanical transmission. Then the clutch closes and controls and regulates the power of the internal combustion engine and of the electric machine so that the desired rotational speed curve of the driven wheels is adjusted as far as possible. In addition and insofar as required, the internal combustion engine obviously is previously started, as above described. In this way a travel in the boost mode can be implemented especially easily and the components of the drive train carefully and safely.

BRIEF DESCRIPTION OF THE DRAWINGS

The invention will now be described, by way of example, with reference to the accompanying drawings in which:

FIG. 3 is an ideal typical time variation of the rotational speeds of the electric machine and of the internal combustion engine when starting;

FIG. 4 is an ideal typical phase diagram of the electric machine in the course of time during a start of the internal combustion engine;

FIG. 5 is an ideal typical phase diagram position of the shifting elements of the first gear in the course of time during a start of the internal combustion engine, and FIG. 6 is an ideal typical phase diagram of the clutch in the course of time during a start of the internal combustion engine.

DETAILED DESCRIPTION OF THE INVENTION

Figure 1:
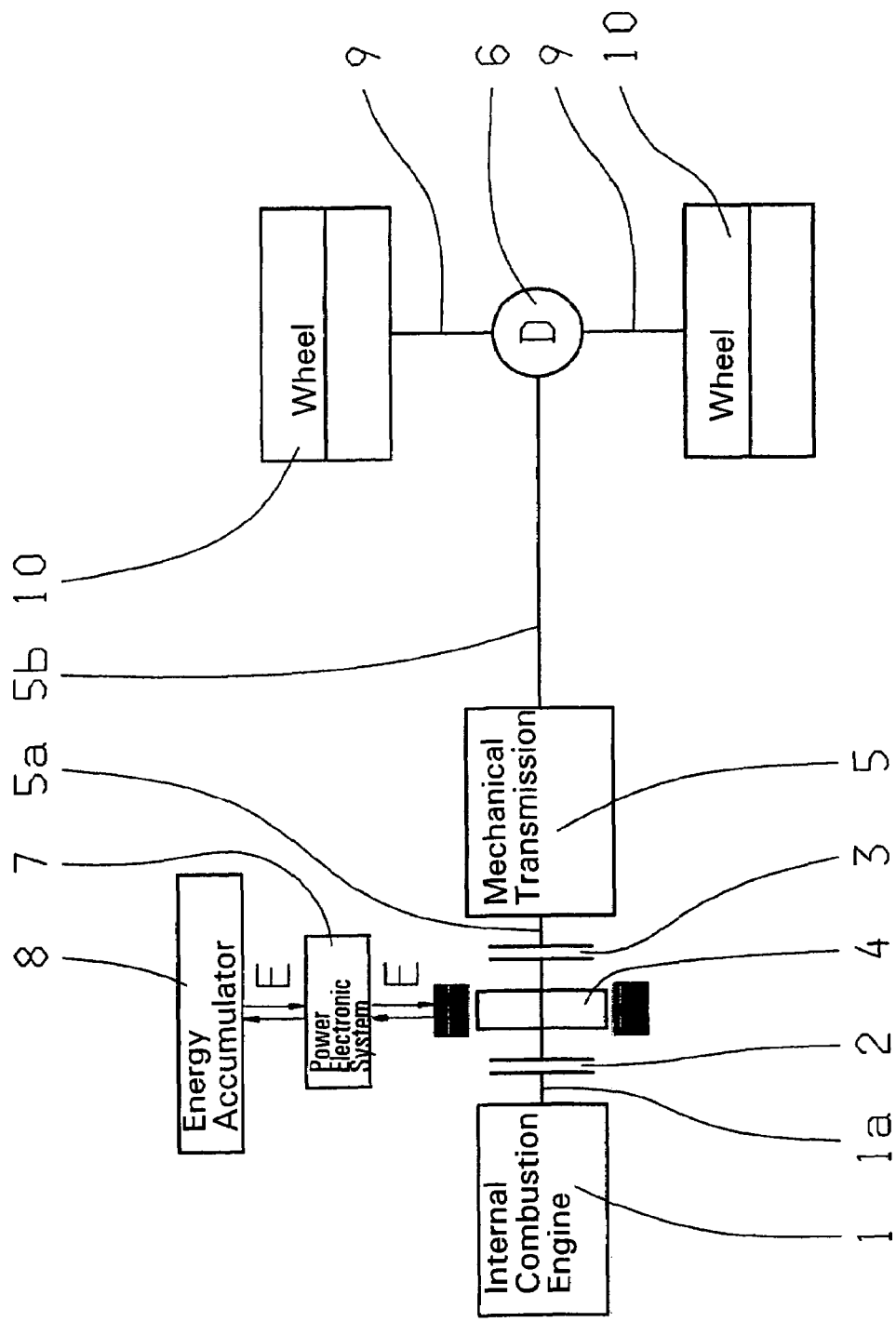
FIG. 1 is a basic sketch of a known hybrid drive mechanism.

As has already been explained, FIG. 1 shows a basic sketch of an already known hybrid drive mechanism. Here an internal combustion engine 1 with its motor drive shaft 1a is coupled, via a first clutch 2, with the shaft of an electric machine 4 which, in turn, is connected via a second clutch 3 with the input shaft 5a of a mechanical transmission 5. The output shaft 5b of the mechanical transmission 5 is connected with a differential transmission 6, which distributes the abutting torque to both halves of a driven axle 9 which, in turn, drive the wheels 10 of the vehicle.

This apparently simple construction needs, together with the electric machine 4, in any case indispensable, and likewise in every case needed power electronic system 7 the same as an appertaining energy accumulator 8, the second clutch 3, which must be dimensioned strongly enough to transmit in the every day use the whole torque at least of the internal combustion engine to the transmission. The double arrows, shown in FIGS. 1 and 2 and designated with the letter E, symbolize the energy flow from the energy accumulator 8 to the power electronic system 7 and from the latter to the electric machine 4 insofar as the latter is operated as an electric motor, the same as the reverse energy flow for the case that the electric machine 4 is operated in the generator operation.

Even though it is actually possible with such a device in the first place, when the first clutch 2 is open and the second clutch 3 closed, electromotively and based on the second clutch 3 to start wear free, while the internal combustion engine 1 is out of operation. But to start the internal combustion engine 1, the first clutch 2 is then to be slowly closed in order to accelerate the internal combustion engine 1 to the starting rotational speed needed.

Evidently there can also be provided for starting the internal combustion engine 1, instead of the closing of the first clutch 2, any other devices which would, however, always mean a considerable added expenditure to ensure a function also to be implemented with the system described and, therefore, are to be rated as still less advantageous. To prevent irrepressible great shifting jerks during closing of the first clutch 2, only frictional clutches can be considered for this.

While starting by way of the electric motor 4 would absolutely make possible the installation of a form-locking clutch as second clutch 3, to achieve acceptable driving properties, it is urgently advised in the practice, during starting of the internal combustion engine 1, partly to open the second clutch 3 in order thus to prevent a transfer of a starting jerk and of rotation fluctuations of the starting internal combustion engine 1 to the input shaft 5a of the mechanical transmission 5 and thus ultimately to the driven wheels 10.

An acceptable start of the internal combustion engine 1 by way of this system thus presupposes a coordinated actuation of the first and second clutches 2 and 3, taking into account as other marginal parameters at least the acceleration desired by the driver, the forces countering the acceleration determined by the mass moment of inertia of the load and by ascent, the properties constantly changing by wear of the clutches 2 and 3 and the starting properties of the internal combustion engine 1, which change with age, operating hours, temperature, oil viscosity and other parameters. Without taking into account the parameters, the control is thus disproportionately susceptible or alternatively extraordinarily expensive and complex.

Figure 2:
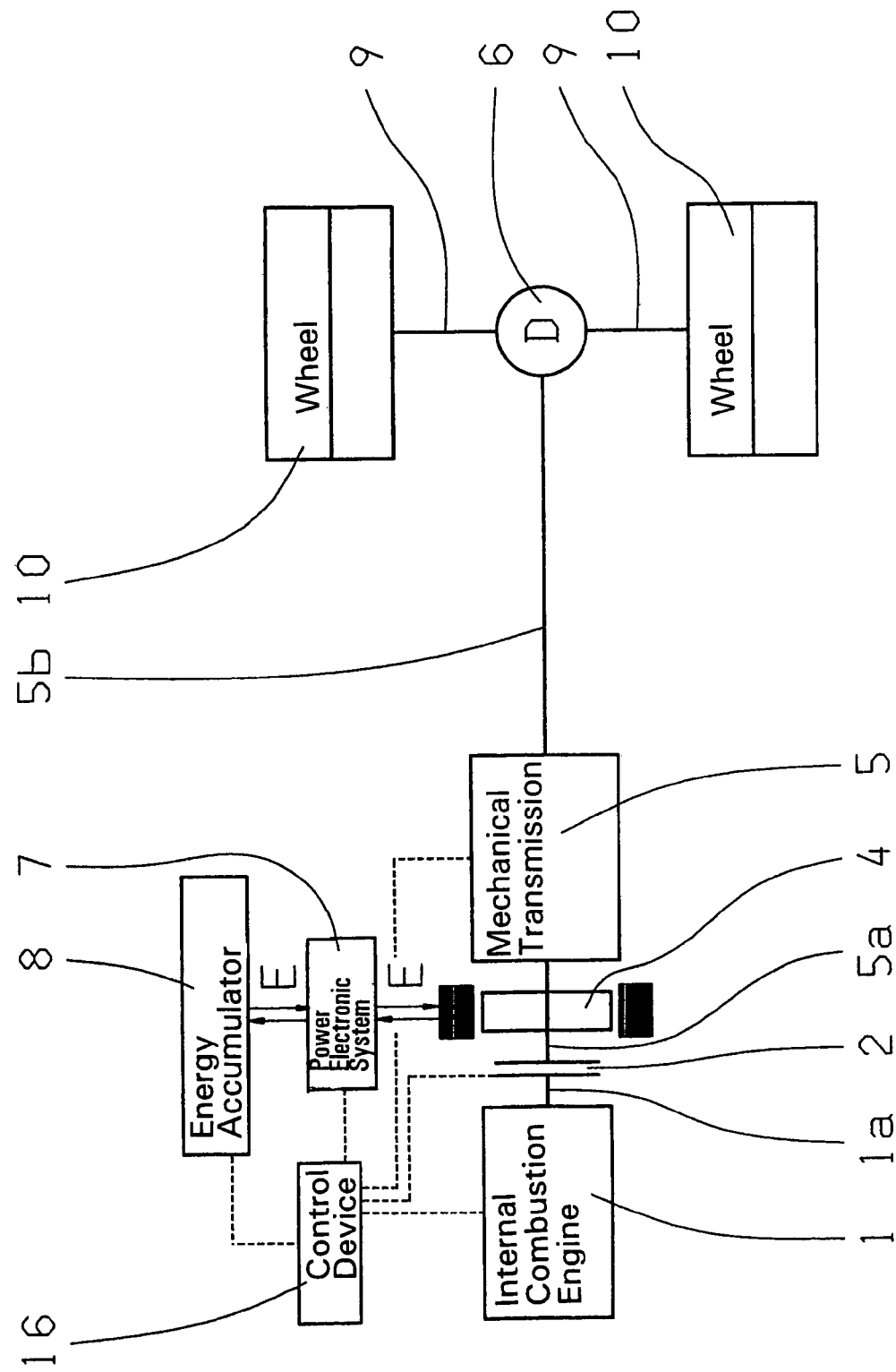
FIG. 2 is a basic sketch of an inventive hybrid drive mechanism.

On the other hand, the inventive hybrid drive mechanism, according to FIG. 2, eliminates the second clutch 3 while the construction can otherwise be identical. Hence, the same elements are provided with the same reference numerals in FIG. 2 wherein, for lack of the second clutch 3, the formerly first and now single clutch 2 is still designated only as the clutch in the description.

The modification, slight only at first sight, offers not only a decisive advantage relative to the needed installation space, but also makes possible relative to the inventive method described in detail herebelow the use of a form-locking clutch 2 of small construction, reasonable cost and maintenance free such as a dog clutch.

In FIGS. 3 to 6 are plotted different variations in the course of time, the horizontal time axis being actually identical so that for the point lying perpendicularly between each other of the different Figures, there is a uniformity. Certain moments are marked t0 to t6 to increase the ease of inspection.

In FIG. 3, a continuous line 11 shows the curve of the rotational speed of the electric machine 4, while a dotted line 12 shows the curve of the rotational speed of the internal combustion engine 1.

To implement a quick start of the internal combustion engine 1 and a subsequent wear free electromotive start, the shifting elements for the first gear when the mechanical transmission 5 is connected in neutral are already lightly plotted, as indicated in a curve 14 of FIG. 6, in time intervals t0 to t2 and thus already prepared for activating the first gear. But this is already a development of the invention and not an unalterable part of the inventive method. In any case, a control device 16 takes care that the mechanical transmission 5 is in a neutral position in which no torque transfer worth mentioning takes place from the input shaft 5a to the output shaft 5b of the mechanical transmission 5.

According to the variation of a curve 15 in the time interval t0 to t1 the clutch in FIG. 6, between internal combustion engine 1 and mechanical transmission 5, is closed. Thus, the electric machine 4, operated as electric motor under adequate control by the power electronic system 7, for example, according to a power line 13 of the electric machine in FIG. 4, rotates the internal combustion engine 1 with increasing rotational speed 12, without any torque worth mentioning being transferred to the output shaft 5b of the mechanical transmission 5 and thus to the wheels 10.

After start of the internal combustion engine 1 at moment t1, the clutch 2 is opened and thus the rotational speed of the electric machine 4 and of the internal combustion engine 1 are uncoupled (see FIG. 3). Since for starting the internal combustion engine 1, due to the mechanical transmission 5 in the neutral position, no attention needs to be given to the eventual reactions of the starting operation on the driving properties. The internal combustion engine 1 can be started quite quickly and the power electronic system 7 controlled and regulated actually almost rectangularly, as shown in the curve 13 of FIG. 4.

It evidently applies here and to all other curves that what is involved in the variations shown are ideal typical variations for explaining the essence of the invention. In the practice, marginal effects, such as transient peaks, mechanical inertias and others, are to be taken into account, which are partly necessary and partly lead to preventing undesired effects, such as ramp-like or parabolic switch-in variations or curve variations of this and other curves.

Then after the moment t1, the control device 16 briefly controls or regulates the power electronic system 7 of the electric machine 4 now connected neither with the internal combustion engine 1 nor with the driven wheels 10 so that their rotational speed at the moment t2 drops to almost zero (FIG. 3). As a result of the small masses to be decelerated in relation to the available power of the electric machine 4, it is required for this only a reasonable control of the power electronic system 7 and a very short time interval between moments t1 and t2. At the moment t2, the already previously prepared shifting elements of the first gear of the mechanical transmission 4 are actuated when the clutch 2 is already open and thus the first gear is activated. The power electronic system of the electric motor 4 is simultaneously controlled again so that, according to the curve 13 in FIG. 4, it is operated by motor. The precise variation of the control obviously depends on the power requirements, for example, of the driver.

In the time interval between t2 and t4, the rotational speed of the electric machine 4 increases, the rotational speed of the driven wheels 10 being correspondingly increased by the now rigid coupling via the activated first gear of the mechanical transmission 5. During this time, the internal combustion engine 1 runs free of load and by the clutch 2 uncouples to idling speed which, in modern motors, implies only a minimal fuel consumption. At the moment t3, the rotational speed of the electric machine 4 reaches the rotational speed of the internal combustion engine 1 which is in idling speed.

Shortly, before reaching the upper limit of the speed attainable only electromotively in the first gear or also shortly before for other reasons, the switching in of the internal combustion engine 1 is desired, the latter is controlled or regulated from the moment t4 so that the rotational speed thereof is raised, according to the dotted curve 12 in FIG. 3.

Specially at high acceleration requirements, a boosting operation can also be provided in which both the internal combustion engine 1 and the electric machine 4 deliver a positive torque to the input shaft 5a of the mechanical transmission 4. Finally, it can also occur, for example, that for reasons of the battery management, such as of the energy accumulator 8, a shift should be made to a drive by the internal combustion engine 1, while the electric machine 4 is to be operated in the generator operation from the moment t6, as indicated by the variations of the curve 13 in FIG. 4.

In any case, for shifting to the internal combustion engine 1 or connection thereof from moment t4, the rotational speed of which is raised by the control device 16 until the rotational speeds of the internal combustion engine 1 and of the electric machine 4 at the moment t5 are at least almost identical and the clutch 2 can thus be closed almost wear free.

For the case that a frictional clutch is provided as clutch 2, a differential rotational speed as low as possible is preferred here and the actual differential rotational speed should be determined preferably taking into account the clutch wear to be assumed and the possible reaction time until the desired introduction of an input torque of the internal combustion engine 1 on the input shaft 5a of the mechanical transmission 5 should be determined.

For the case that as clutch 2, a form-locking clutch and especially a dog clutch is provided, a differential rotational speed between the rotational speeds of the internal combustion engine 1 and of the electric machine 4 is preferred in order reliably to eliminate a tooth-on-tooth position.

The method introduced is especially adequate for vehicles with hybrid drive mechanisms and a stop-start system which disengages the internal combustion engine in the presence of preset switch off conditions, and restarts it under preset starting conditions. A known switch off condition is the vehicle stoppage with an actuated brake pedal of the service brake while a known starting condition is the vehicle stoppage, the release of the service brake and the deviation of the accelerator pedal. One such or similarly released automatic starting operation can advantageously takes place with an inventively working method.

REFERENCE NUMERALS

1 internal combustion engine
1a motor drive shaft
2 clutch, first clutch
3 second clutch
4 electric machine
5 mechanical transmission
5a transmission input shaft
5b output shaft of the mechanical transmission
6 differential transmission
7 power electronic system
8 energy accumulator
9 driven axle
10 wheels
11 rotational speed curve of the electric machine
12 rotational speed curve of the internal combustion engine
13 shifting curve of the power electronic system to operate the electric machine
14 shifting curve of the shifting elements to activate the first gear
15 shifting curve of the clutch
16 control device
t0-t6 moments

The invention claimed is:

1. A method for controlling a hybrid drive mechanism having a variable ratio transmission (5), an electric machine (4) operable as a motor and connected directly to a transmission input shaft (5a) of the transmission (5) for transmitting at least one of positive torque and negative torque to the transmission (5), and an internal combustion engine (1) connectable to the transmission input shaft (5a) by a clutch (2), comprising the steps of:

at an initial time ($t_0$),
  setting the internal combustion engine (1) in an off state and the transmission (5) in a neutral state, and
  engaging the clutch (2) to connect the electric machine (4) to the internal combustion engine (1),
in a first interval between initial time ($t_0$) and a first time ($t_1$),
  driving the internal combustion engine (1) with the electric machine (4) to increase the rotational speed of the internal combustion engine (1) to an internal combustion engine idle speed,
at first time ($t_1$),
  turning on the internal combustion engine (1) and disengaging the clutch (2),
in a second interval between first time ($t_1$) and a second time ($t_2$),
  decreasing the rotational speed of the electric machine (4), and
  selecting a gear ratio of the transmission (5),
at second time ($t_2$),
  engaging the transmission (5) in the selected gear ratio,
in a third interval between second time ($t_2$) and a third time ($t_4$),
  controlling the rotational speed of the electric machine (4) and thereby of the transmission input shaft (5a) according to a desired rotational speed of an transmission output shaft (5b),
at the third time ($t_4$),
  detecting that a desired rotational speed of the transmission output shaft (5b) is approaching a maximum speed attainable by the electric machine (4) with the transmission (5) in the selected gear ratio,
in a fourth interval between the third time ($t_4$) and a fourth time ($t_5$),
  controlling the rotational speed of the internal combustion engine (1) to be approximately the rotational speed of the electric machine (4), and
  engaging the clutch (2) so that the internal combustion engine (1) drives the transmission input shaft (5a), and
in a fifth interval after fourth time ($t_5$),
  controlling the rotational speed of the internal combustion engine (1) and thereby of the transmission input shaft (5a) according to a desired rotational speed of the transmission output shaft (5b).

2. The method for controlling a hybrid drive mechanism of claim 1 wherein the transmission (5) is a power shift automatic transmission.

* * * * *